US008072608B2

(12) United States Patent
Steffens et al.

(10) Patent No.: US 8,072,608 B2
(45) Date of Patent: Dec. 6, 2011

(54) APPARATUS AND METHOD FOR A COMBINED INTERFEROMETRIC AND IMAGE BASED GEOMETRIC DETERMINATION, PARTICULARLY IN THE MICROSYSTEM TECHNOLOGY (75) Inventors: Norbert Steffens, Überheim (DE); Peter Lehmann, Gottingen (DE)

(73) Assignee: Carl Mahr Holding GmbH, Göttingen (DE)

( * ) Notice: Subject to any disclaimer, the term of this patent is extended or adjusted under 35 U.S.C. 154(b) by 276 days.

(21) Appl. No.: 12/290,063

(22) Filed: Oct. 27, 2008

(65) Prior Publication Data

US 2009/0059208 A1 Mar. 5, 2009

Related U.S. Application Data (63) Continuation-in-part of application No. PCT/EP2007/003940, filed on May 4, 2007.

(30) Foreign Application Priority Data

May 8, 2006 (DE) .......................... 10 2006 021 557

(51) Int. Cl.
G01B 9/02 (2006.01)
(52) U.S. Cl. .......................................... 356/479; 356/72
(58) Field of Classification Search .................. 356/479, 356/497, 72, 73, 485, 489, 495, 505, 511
See application file for complete search history.

(56) References Cited

U.S. PATENT DOCUMENTS

| 3,830,562 | A * | 8/1974 | McGrann et al. ............. 351/214 |
| 5,644,642 | A * | 7/1997 | Kirschbaum .................. 382/103 |
| 6,361,167 | B1 * | 3/2002 | Su et al. ......................... 351/206 |
| 6,496,267 | B1 * | 12/2002 | Takaoka ......................... 356/497 |
| 7,466,427 | B2 * | 12/2008 | Ueki ............................ 356/497 |
| 2003/0218673 | A1 | 11/2003 | Abnet et al. |
| 2007/0070295 | A1 * | 3/2007 | Tsukada et al. ............... 351/206 |
| 2009/0268209 | A1 * | 10/2009 | Waelti et al. .................. 356/479 |

FOREIGN PATENT DOCUMENTS

| DE | 197 40 678 A1 | 3/1999 |
| DE | 1 610 088 A1 | 12/2005 |
| EP | 1 719 973 A1 | 11/2006 |
| JP | 2005-241493 A | 9/2005 |
| WO | WO 2005/108915 A | 11/2005 |
| WO | WO 2005/108915 A1 | 11/2005 |

* cited by examiner

Primary Examiner — Tarifur Chowdhury
Assistant Examiner — Jonathon Cook
(74) Attorney, Agent, or Firm — R. S. Lombard; K. Bach (57) ABSTRACT The apparatus and method according to the invention includes an objective (8) which is capable of operating basically in two different measuring modes. In a first interference mode, a measuring object (9) is interference—optically measured. In a second imaging operating mode on a detector array (12) designed like a camera, an optical image is generated, which is supplied to an image processing routine. The switching over between the two operating modes occurs by switching the illumination devices which are associated with different locations of the beam path of the apparatus—when viewed from the camera, one in front of a beam divider and the other behind the beam divider, which couples a reference light path to the beam path.

28 Claims, 5 Drawing Sheets

APPARATUS AND METHOD FOR A COMBINED INTERFEROMETRIC AND IMAGE BASED GEOMETRIC DETERMINATION, PARTICULARLY IN THE MICROSYSTEM TECHNOLOGY

CROSS-REFERENCE TO RELATED APPLICATION

This is a continuation-in-part application of pending international application PCT/EP 2007/003940 filed May 4, 2007 and claiming the priority of German application No. 10 2006 021 557.5 filed May 8, 2006.

BACKGROUND OF THE INVENTION

The invention concerns an apparatus and a method for an optical measurement of an object to be measured. The apparatus and the method are particularly suitable for measuring tasks in the microsystem technology.

For measuring areas of height structures also on stepped objects optically with highest precision, the vertically scanning white-light interferometry (WLI) is particularly suitable. Common interferometric arrangements for this purpose are the Michelson interferometer, the Linnik-interferometer and the Mirau interferometer. In the WLI, a white light source, typically a halogen lamp is used for illumination. During the measurement the optical travel distance difference between the measuring beam path and the reference beam path is continuously increased or reduced while at a distance of less than 100 nm (nanometers) interference images of the object are recorded generally by a pixel sensor with areal resolution (for example a CCD- or CMOS array). The optical travel distance change can be generated by a movement of the object being measured in the direction of the interferometer, a movement of the interferometer in the direction toward the object or away therefrom, a movement of the interference objective or a reference mirror. This procedure is called vertical scanning A. The intensity curve for each camera pixel, the so-called correlogram which depends on the optical travel length difference is then submitted to further signal evaluation.

In the WLI signal evaluation a distinction is made between a coherence peak evaluation which provides for a relatively coarse estimation of the height location of a measuring point with deviations of at times, more than 100 nm, and the phase evaluation, which provides for measurement errors in the nano or sub-nano range. The height measurement range can be several millimeters.

Lateral geometric features of objects to be measured can be determined via a digital evaluation of pixel images, for example, using an edge detection algorithm. In connection with microscopic objects, measuring microscopes are consequently equipped with suitable cameras in order to record such pixel images and subsequently evaluate them digitally. An advantage of this procedure resides in the high measuring speed which, with a corresponding synchronization between the image establishment and the excitation of the measuring object, permits also examinations of the dynamic behavior of the respective measuring objects to be performed. However, all microscopic procedures are, with regard to the achievable lateral resolution, subject to the limitations set by the diffraction-limited mapping. With the use of visible light, this results generally in lateral resolutions of about 0.5 μm (micrometer).

If the evaluation of lateral structures based on the digitized light-microscopic imaging is to be performed with one of the above-mentioned interferometer arrangements, the interference effects necessarily occurring in connection with the interference microscopy because of the additional image contrasts caused thereby are troublesome.

Therefore, WO 2005/108915 A1 proposed a measuring arrangement which can operate with the same objective in an interferometric as well as in an imaging operating mode. To this end, two light sources are provided which emit light of different spectral composition. In this reference light path a filter is arranged which permits only light of the one spectral composition to pass but not light of the other composition.

With this principle the use of different types of light is provided in the different modes of operation.

It is the object of the present invention to improve this situation.

SUMMARY OF THE INVENTION

The apparatus and method according to the invention includes an objective (8) which is capable of operating basically in two different measuring modes. In a first interference mode, a measuring object (9) is interference—optically measured. In a second imaging operating mode on a detector array (12) designed like a camera, an optical image is generated, which is supplied to an image processing routine. The switching over between the two operating modes occurs by switching the illumination devices which are associated with different locations of the beam path of the apparatus—when viewed from the camera, one in front of a beam divider and the other behind the beam divider, which couples a reference light path to the beam path.

With the apparatus according to the invention and the method according to the invention at least two operating modes are available, that is an interferometric operating mode and an imaging operating mode in which image processing or a manual observation of the measuring object or an image recording for storing the images or for later image evaluation can be performed.

The measuring arrangement includes a first and a second illumination arrangement with light sources which emit light with a different or with the same spectral composition. Switching over between the two modes of operation is achieved by switching between the two light sources of which then either only the first or only the second is operated. The different modes of operation achieved by alternative activation of the illumination arrangements by passing the light of the one (first) light source through a beam divider via which a reference light path is connected to the beam input in a first direction in which a reference light beam is branched off, whereas the light of the other (second) light source passes through this beam divider only in the opposite direction in which the beam divider does not branch off any light into the reference light path.

To this end for example the light of the first illumination arrangement is coupled into the beam path of the measuring apparatus at a location between the beam divider and the image recording arrangement. In contrast, the light of the second illumination is coupled into the beam path of the measuring apparatus at a second location between the beam divider and the measuring object or, alternatively it is radiated onto the measuring object. The light of the first illumination arrangement then passes through the beam divider in a direction toward the measuring object and the light reflected from the measuring object passes through the beam divider in the opposite direction. That is the light passes through the beam divider twice, that is in the forth direction and in the back direction. Of the light directed onto the measuring object through the beam divider a part is branched off into the reference light path.

The light of the second illumination arrangement does not pass through the beam divider in the direction toward the measuring object, in which light could be branched off into the reference light path. Therefore, the reference light path is totally inactive for the light of the second illumination arrangement and this is true also if the first and the second illumination arrangement use the same light sources. Limitations in the state of the art concerning the selection of light sources for the illumination arrangements for providing for the different measuring modes are therefore eliminated.

As light sources for the first and also for the second illumination arrangement short-coherent light sources, long-coherent light sources, color-light sources, white-light sources, such as for example laser diodes, light emitting diodes, color light emitting diodes, white light-emitting diodes, super luminescent diodes, halogen lamps and similar may be used. The switch-over between the operating modes is of purely electronic nature—it is only necessary to activate or deactivate the illumination arrangements. No mechanical adjustment is necessary nor is it necessary to change an objective. Whereas in the interference-optical operating mode, the measuring object is illuminated with light passing through the objective, in the imaging mode the illumination can be determined arbitrarily within wide limits. Illumination may be provided through the objective in the form of vertical illumination, or as transmitted light illumination or as dark field illumination or another illumination of the measuring object or the measuring object carrier. The dark field illumination arrangement may be provided for example with an annular light emitting diode arrangement.

With the light-microscopic scanning A. with subsequent interferometric measurement procedures can be realized. In the light-microscopic mode of operation additional rapid examination of the dynamic behavior of the object or system being examined is possible.

As objective preferably a Mirau-interference objective with integrated beam divider plate and integrated reference mirror is used.

The light-microscopic image taken for example using blue light, permits for example a lateral determination of geometric elements with a high resolution. Already because of the small wave length of the blue light lateral resolutions of less than 0.5 µm can be achieved. With the aid of an external light source on the basis of blue LED's, for example, an annular light illumination with controllable segments, it is possible to measure during the image processing mode also on inclined mirror flanks without the need of tilting the measuring object in a complex, time-consuming manner.

By extending the operation also to the use of Michelson objectives larger measuring ranges (with reduced lateral resolution corresponding to the smaller numerical aperture) can be covered in one measuring procedure. The Linnik arrangement, on the other hand, is expedient in order to minimize the lateral resolution by selecting as large a numerical aperture of the objectives as possible. It is also possible to use several objectives in the apparatus for example with the use of an objective revolver.

The interferometric arrangement can be operated according to one aspect of the invention also as a phase-changing interferometer. In this case an essentially mono-chromatic light source is used for the interferometric measurement.

The additional arrangement of a tactile micro-scanner in the view field of the microscope permits a determination of geometric measuring data also of structures which are not accessible by an optical measurement. Herein, the tactile measurement occurs as a result of the mechanical coupling with the optical arrangement in the same reference system as the interferometric measurement and the image processing. The tactile micro-scanner may be for example in the form of a silicon bending arm which is provided with a piezo resistive bridge circuit for measuring the caliper deflection.

The coupling of the measuring arrangement with mechanical positioning units for the X, Y and Z axes, which may be provided with suitable incremental measuring systems makes it possible to place measurements of different object areas in relation to one another. Depending on the measurement objective also rotational positioning axes may be expedient.

The apparatus according to the invention may be in the form of a compact sensor module and facilitates, with comparatively small apparatus expenses, a multitude of applications, specifically in the field of micro-system engineering. It accommodates the growing needs for measurement accuracy, measuring speed and process-related and flexible applicability. The use of LED's as light sources is advantageous over thermal radiators as they widely are used in the while light interferometry, with regard to design freedom, compactness, life and reduction of thermal disturbances.

In the method according to the invention the individual systems of the measuring arrangement are operated so tuned to one another that the respective measuring task is performed in an optimal manner. Herein the lateral structure sizes are analyzed by image processing, the structure heights are determined by white light interferometry and further features, for example microstructures on vertical flanks are determined, if applicable by way of a tactile micro-scanner. All measuring data are present in the same reference system and therefore can be combined with one another.

Further particulars of advantageous embodiments of the invention are apparent from the drawings

BRIEF DESCRIPTION OF THE DRAWINGS

The drawings show exemplary embodiments of the invention as follows.

DETAILED DESCRIPTION OF PARTICULAR EMBODIMENTS

Figure 1:
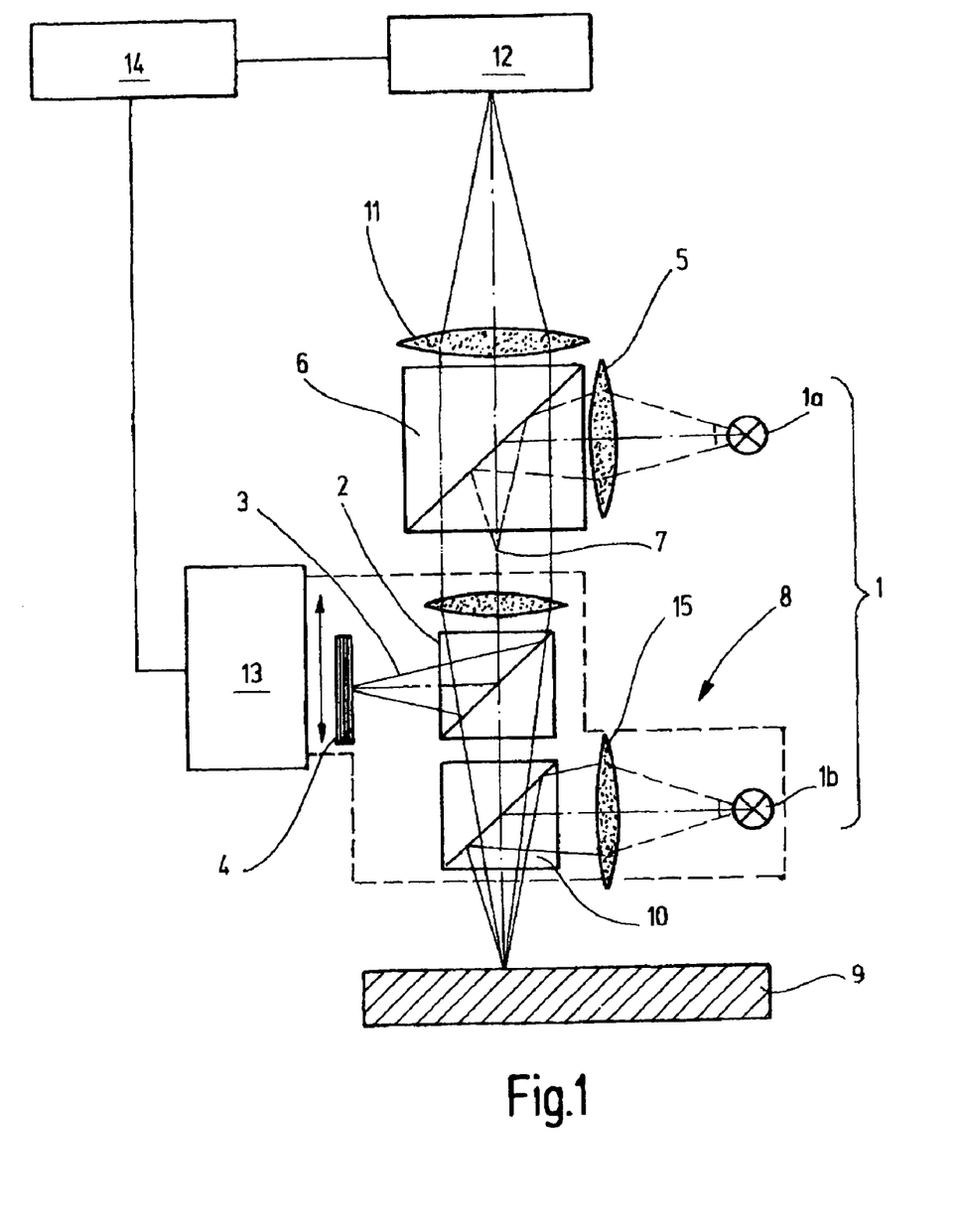
FIG. 1 shows schematically an apparatus according to the invention for the optical measurement of a measuring object based on a Michelson-interferometer.

FIG. 1 shows an apparatus for a combined areal determination of height values of a measuring object 9 alternatively in an interferometric operating mode and in an image processing mode by means of optical imaging of the measuring object 9. Part of the apparatus is an illumination arrangement 1 with a first illumination device 1a and a second illumination device 1b for illuminating the measuring object 9. The illumination devices 1a, 1b comprise light sources for example with optical structure via which the light is directed in each case onto the surface of the measuring object 9.

The illumination devices 1a, 1b emit light of the same or different spectral compositions. For example, the first illuminating device 1a may be a white light LED which generates a relatively wide light spectrum. The second illumination device 1b is for example a blue light, that is, a short light wave, emitting diode. Alternatively both illumination devices 1a, 1b may be white light LED's or color, for example blue light LED's or other light sources may be used.

The measuring apparatus includes a light path which extends from the measuring object to an image recording device 12. In the beam path, a beam divider 2 is arranged in which a reference light path 3 is added. In the reference light path 3, a mirror 4 is arranged. By a condenser 5 and a further beam divider 6, the light source of the first illumination device 1a is depicted on an entrance pupil 7 of an objective 8 which contains the beam divider 2 and the reference mirror 4. In the interferometric operating mode, a part of the light of the light source 1a has been branched by the beam divider 2 off the beam path by the beam divider 2 and is conducted through the beam divider 2 to the reference mirror 4 and is reflected therefrom. Another part of the light is divided from the beam divider 2 first to another beam divider 10 via which the light source of the second illumination device 1b can be mirrored in when needed. The light of the first illumination device 1a passes through the beam divider 10 and is directed onto the measuring object 9, from which it is reflected.

The reference mirror 4 and the part of the measuring object 9 which is within the depth of sharpness are depicted by the objective 8 and a tube lens 11 on a detector array 12, for example, a pixel camera with 800×600 pixels. The light reflected from the measuring object 9 and the mirror 4 is combined by the beam divider 2, it passes through the beam divider 6 and subjected on the detector array 12 to interference.

A positioning unit 13 serves to adjust the objective 8 normal to the measuring object 9, that is in the Z-direction. A digital computer 14 serving as a control device receives the images provided by the data array 12 and controls the positioning unit 13. The interferometric measurement is obtained by moving the positioning unit 13 along the optical axis and taking for different heights positions of the objective interference images which are evaluated in the digital computer 14. For the interference operation, the illumination device 1a, (for example a white light source) is in operation. The illumination device 1b (for example blue LED's) is not in operation in the interference mode. The light of the illuminating device 1a passes through the beam divider 2 coupled to the reference light path 3 two times, once forward to the measuring object 19 and once backward to the imaging device 12.

In the image processing mode the illumination device 1a is taken out of operation and the illumination device 1b is switched on. The light is coupled, via a condenser 15 and the beam divider 10, into the beam path in such a way that the reference light path 3 is by-passed. To this end, the beam divider 10 is arranged between the beam divider 2 and the measuring object 9. The light of the illumination device 1b illuminates the measuring object 9 and provides, in connection with the tube lens 11, for the reproduction of the object areas, which are within the sharpness depth of the objective 8, on the detector array 12. The detector array 12 records the image of the object and supplies it to the digital computer 14 connected thereto for the digital evaluation.

In the interferometric operating mode, a procedure as it is known in connection with the white light interferometry can be used for determining the height positions of structures of the measuring object 9. For example, the positioning unit 13 is adjusted until interference phenomena occur and those are then evaluated.

In the image processing mode, the measuring object 9 which is illuminated by light of the illumination device 1b is optically depicted on the detector array 12. The image obtained can be stored by the digital computer 14 or it can be further processed. For example, by means of edge detecting routines, image structures can be recognized and gouged.

The light of the illumination device 1a for the interferometric measurement first reaches the beam divider 2 and then the measuring object 9. The light of the illuminating device 1b reaches first the measuring object 9 and then the beam divider 2.

Figure 2:
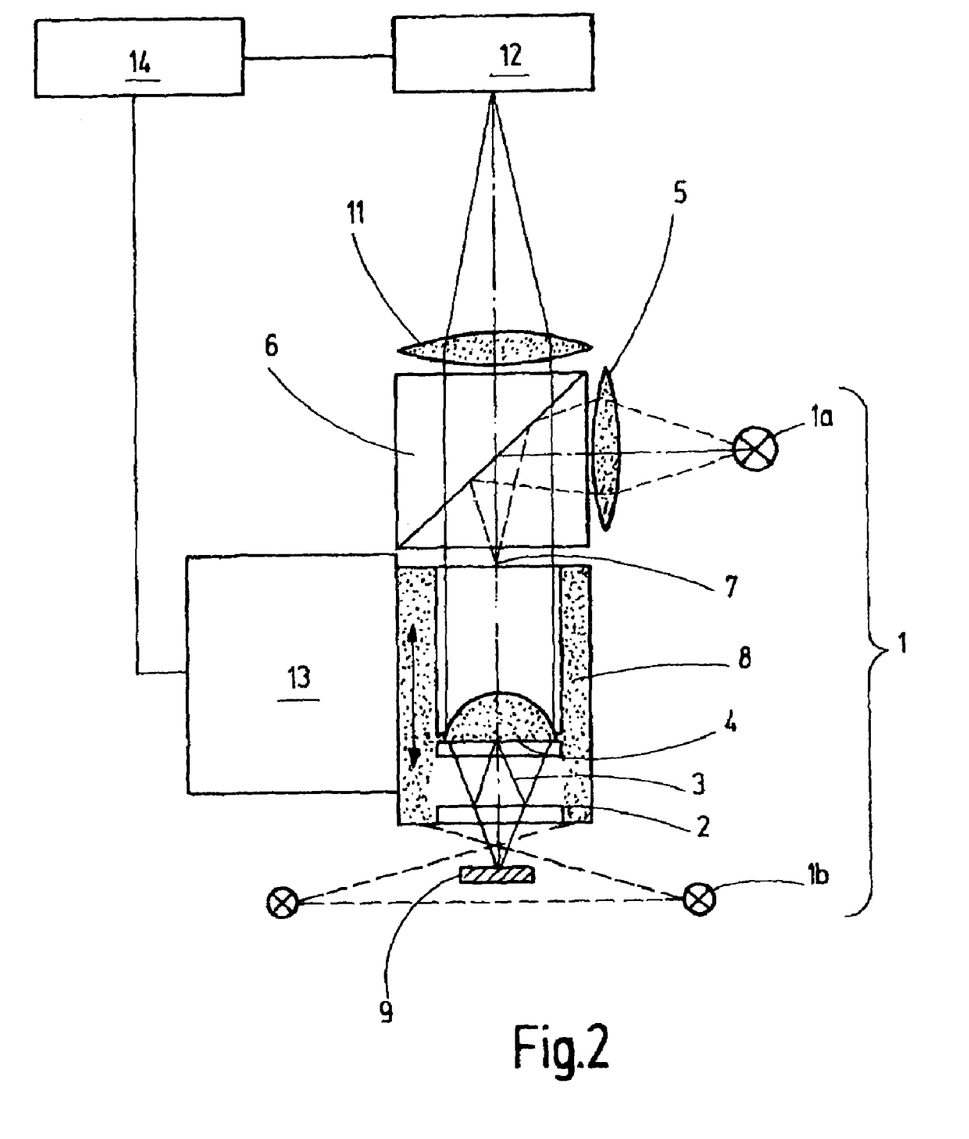
FIG. 2 shows schematically an apparatus according to the invention based on a Mirau-interferometer.

FIG. 2 shows another embodiment of the apparatus according to the invention in the form of a Mirau-interferometer. The previous description is applicable as the same references are used for corresponding parts. The beam divider (conductor) 2 is in the form of a partially reflecting plate. The reference mirror 4 is arranged on the optical axis. The illumination device 1b is arranged outside the objective. It radiates its light onto the measuring object 9, so that, as in the previous example the light reaches the measuring object 9 before it can pass through the first beam divider 2. Only the light arriving from the measuring object 9 passes through the beam divider 2 and reaches the image processing device 12.

Figure 3:
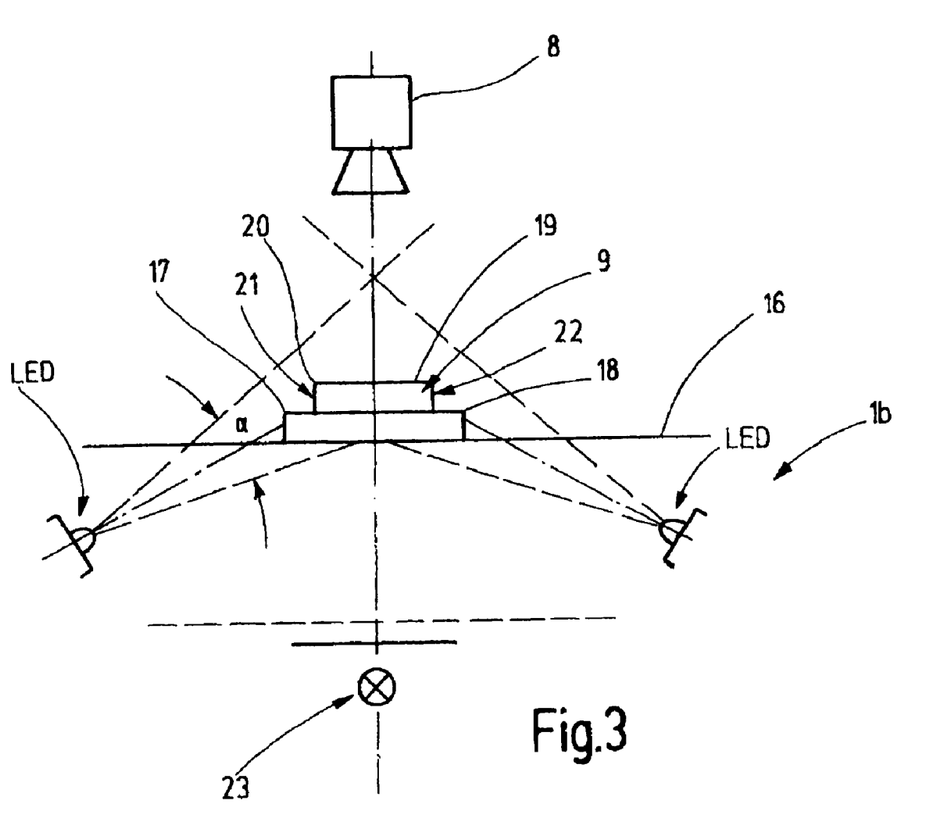
FIG. 3, in principle, shows the apparatus according to FIG. 2 in a sectional representation for an explanation of its dark-field illumination arrangement.
Figure 4:
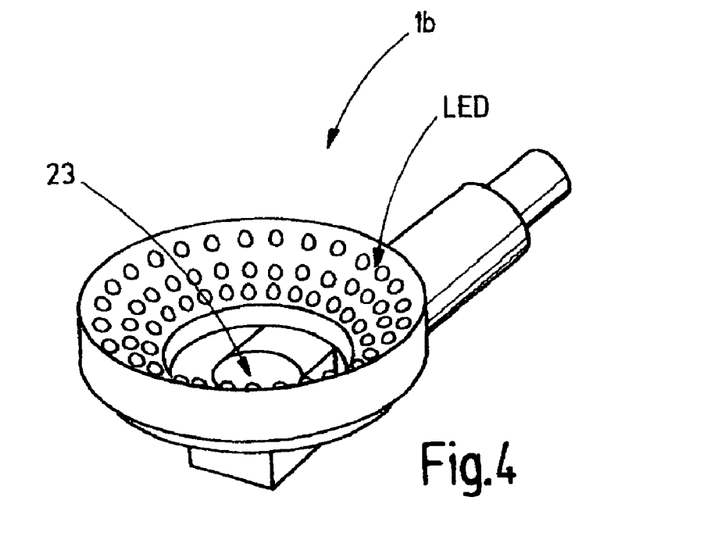
FIG. 4 shows the dark-field illumination arrangement according to FIG. 3 in a perspective representation.

FIG. 3 shows the illumination device 1b in an embodiment or dark field illumination device. The dark field illumination device comprises several light sources, for example, light emitting diodes, which are arranged below a plane 16 on which the measuring object 9 is supported. The measuring object 9 may, as shown, have several steps and edges 17, 18, 19, 20 and side surfaces 21, 22, which are illuminated by the illumination device 1b. To this end, it includes, as already mentioned, a number of light sources, for example, light emitting diodes, which, as shown in FIG. 4, may be grouped in one ring or in several rings. They include each an opening or light emission angle a of for example 25°. Their optical axes coincide preferably in a common point. The light emitting diodes are preferably so arranged that the light emitted therefrom can not directly reach the objective 8.

As shown in FIG. 3 the illuminating device 1b may include a further light source 23, for example, in the form of a light emitting diode or another light source such as an incandescent lamp, which is arranged below the measuring object 9 on the optical axis of the arrangement. This light source may be used for illuminating measuring objects in trans-illumination operation. This may be expedient in connection with translucent or transparent measuring objects. The light emitting diodes may be color light emitting diodes, short wave blue light emitting diodes, ultra-violent radiating light emitting diodes or white light emitting diodes.

Figure 5:
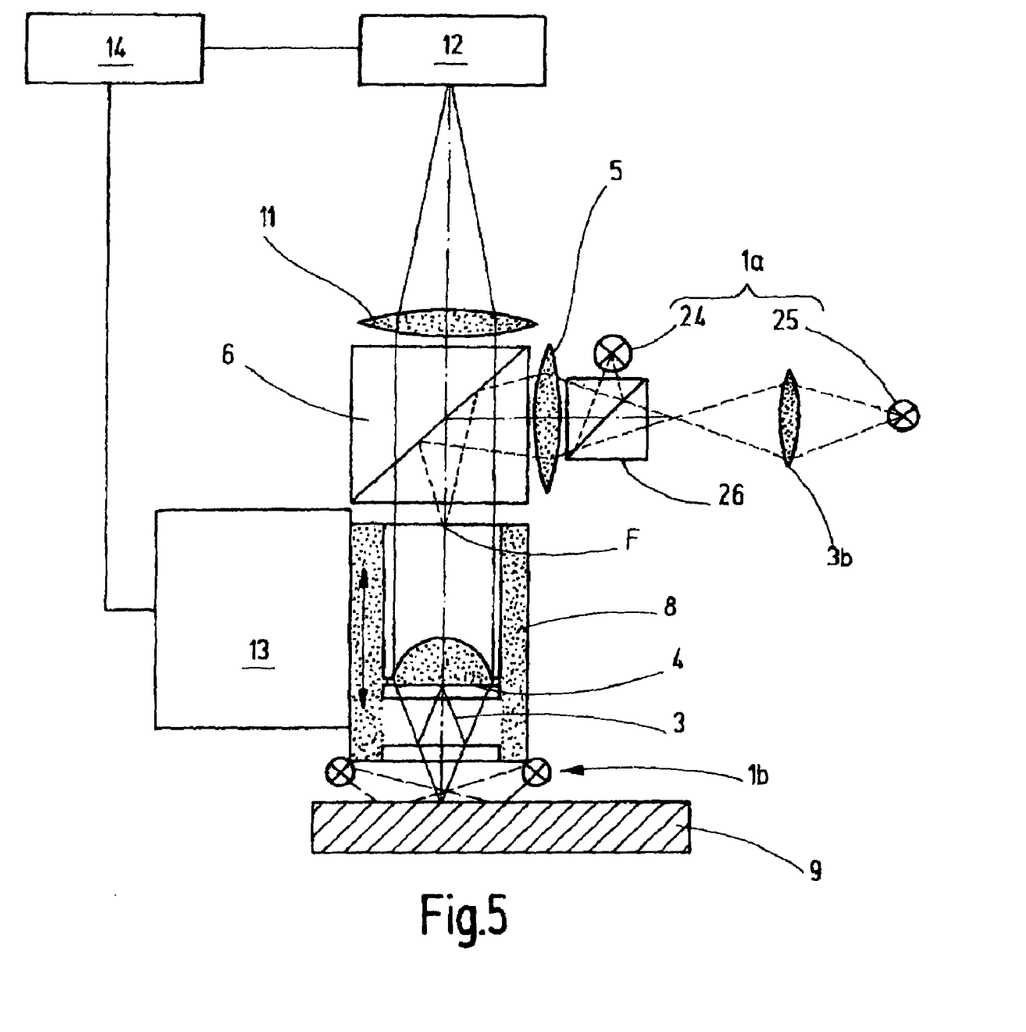
FIG. 5 shows an apparatus according to the invention based on a Mirau-interferometer permitting three measuring modes.

FIG. 5 shows another embodiment of the apparatus according to the invention which is based on the embodiment as shown in FIG. 2. Reference is therefore made to the respective description. Different from the embodiment described earlier, however, the illumination device 1b is arranged above the measuring object 9 and provided for top illumination. The illumination device 1b can comprise one or several light sources, which direct their light onto the measuring object 9, but not into the objective 8. Consequently, only the light of the illuminating device 1b returned from the measuring object 9 reaches the objective 8. The reference beam path 3 is inactivated in this operating mode—optical imaging is used in this case.

Furthermore, the illumination device 1a may comprise two light sources 24, 25 whose light is combined by way of a beam divider 26 and is directed via a condenser 5 and a beam divider 6 into the beam path of the apparatus. The light sources 24, 25 may have different spectral properties which are both suitable for the interferometric operating mode. For example, one may be long coherent and the other may be short coherent. As interference generating objective an arrangement according to Michelson, Mirau or also Linnik may be used.

Figure 6:
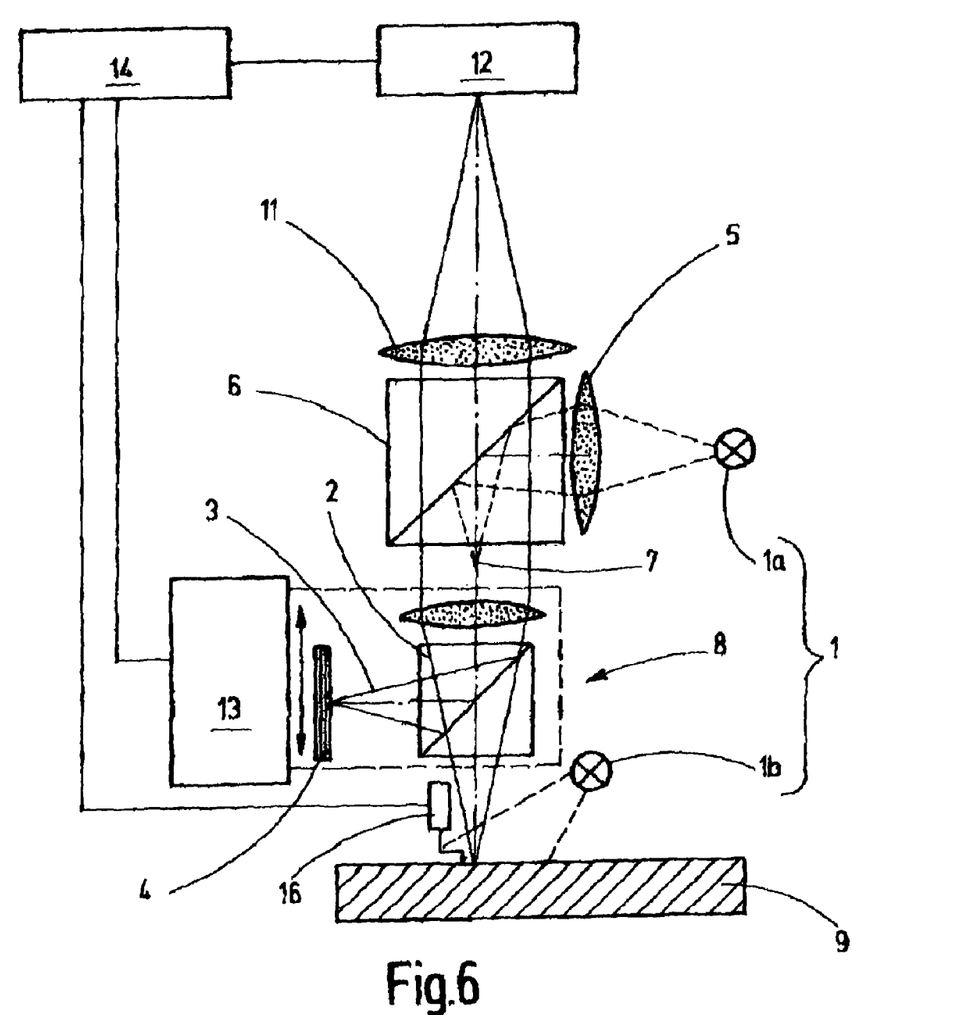
FIG. 6 shows schematically a measuring arrangement with an interferometric operating mode, an imaging operating mode and additionally, a mechanical scanner.

As shown in FIG. 6, additionally a point-measuring scanner 16 may be introduced into the vision field of the imaging optics. This is applicable to all the embodiments described above. The point-like measuring scanner 16 is preferably connected to the digital computer 14.

With the translational and/or rotational adjustment devices, that is the axes assigned to the measuring object 9 and/or the apparatus, particularly, the objective 8, a change of the relative position between the measuring object and the measuring apparatus can be accomplished.

What is claimed is:

1. An apparatus for the imaging and/or measuring of a measuring object (9) by means of interferometry in an interferometric imaging mode and by means of non-interferometric imaging in an optical imaging mode by recording a digital evaluation of optical images of the measuring object (9), comprising:
    an objective (8) for determining a beam path and for receiving light from the measuring object (9) and for supplying the received light to an image receiving device (12), the measuring object (9) is positioned in the same beam path along the optical axis of objective (8);
    a positioning unit (13) for adjusting the relative distance between the objective (8) and the measuring object (9) along the optical axis;
    a first beam divider (2) for determining together with a reflector (4) a reference light path (3), said beam divider (2) arranged in the beam path;
    a first illumination device (1a) for illuminating the measuring object (9) associated with the beam path so as to introduce light emitted from the first illumination device (1a) into the reference light path (3) and also into the beam path, the first illumination device (1a) is connected to the beam path at a location between the image receiving device (12) and the first beam divider (2) so that the first illumination device (1a) light passes through the beam divider (2) in two directions opposite to each other, and;
    a second illumination device (1b) for illuminating the measuring object (9) while the light thereof is kept away from the reference light path (3), the light of the second illumination device (1b) passes through the first beam divider (2) exclusively in a direction from the measuring object (9) toward the image receiving device (12).

2. The apparatus according to claim 1, wherein the second illumination device (1b) is so arranged that its light passes through the first beam divider (2) exclusively in a direction from the measuring object (9) toward the image receiving device (12).

3. The apparatus according to claim 1, wherein the second illumination device (1b) is connected to the objective (8) so as to illuminate the measuring object (9) through the objective (8).

4. The apparatus according to claim 1, wherein second illumination device (1b) is connected to the beam path via a second beam divider (10).

5. The apparatus according to claim 4, wherein the second beam divider (10) is arranged between the first beam divider (2) and the measuring object (9).

6. The apparatus according to claim 1, wherein the second illumination device (1b) is so arranged that its light first reaches the measuring object (9) and then the objective (8).

7. The apparatus according to claim 1, wherein the second illumination device (1b) is arranged outside the objective (8).

8. The apparatus according to claim 1, wherein the second illumination device (1b) is a dark-field illumination device.

9. The apparatus according to claim 1, wherein the second illumination device (1b) is, or includes, a top light illumination device.

10. The apparatus according to claim 1, wherein the second illumination device (1b) is, or comprises, a light source (23) for a translucent illumination.

11. The apparatus according to claim 1, wherein the second illumination device (1b) is, or includes, a telecentric translucent illumination device (23).

12. The apparatus according to claim 1, wherein at least one of the first illumination device (1a) and the second illumination device (1b) includes a white light (LED) source.

13. The apparatus according to claim 1, wherein at least one of the first illumination device (1a) and the second illumination device (1b) comprises a color light source (LED).

14. The apparatus according to claim 1, wherein both the first and the second illumination devices (1a, 1b) comprise white light sources (LED).

15. The apparatus according to claim 1, wherein both the first and the second illumination devices (1a, 1b) include light sources (LED) which emit light of the same spectral composition.

16. The apparatus according to claim 1, wherein the second illumination device (1b) comprises several light sources (LED) for the concurrent illumination of the measuring object (9).

17. The apparatus according to claim 1, wherein the second illumination device (1b) comprises several light sources (LED, 23) for an alternative illumination of the measuring object (9).

18. The apparatus according to claim 17, wherein the light sources (LED, 23) for the alternative illumination of the measuring object (9) provide light of the same spectral compositions.

19. The apparatus according to claim 17, wherein the light sources (LED, 23) for the alternative illumination of the measuring object (9) provide light of different spectral compositions.

20. The apparatus according to claim 1, further including an image processing device (14) connected to the image receiving device (12).

21. The apparatus according to claim 1, wherein the first illumination device (1a) includes at least one light source (24, 25) for the interferometric operating mode, a short coherent light source (24) and/or a long coherent light source (25).

22. The apparatus according to claim 1, wherein the positioning unit (13) is assigned to the interferometric imaging mode, the positioning unit (13) for adjusting the relative position of the objective (8) and/or the measuring object (9) for performing vertically scanning interferometry.

23. The apparatus according to claim 1, further including a phase shifter assigned to the interferometric imaging mode.

24. The apparatus according to claim 1, further including a point-like scanner (16) arranged in the field of sight of the apparatus.

25. The apparatus according to claim 24, wherein the scanner (16) is a mechanical scanner.

26. A method for the combined areal determination of height values of a measuring object (9) by means of interferometry in an interferometric operating mode and for measuring lateral dimensions of geometric elements in an image processing mode by recording and digital evaluation of optical images of the measuring object (9), the method comprises the following steps:

directing the light of a first illumination device (1a) in a first direction toward the measuring object (9) along the optical axis of an objective (8) and in a second direction to an image recording device (12) via a beam divider (2) which connects a reference light path (3) to the beam path of the apparatus, and changing the distance between the objective (8) and the measuring object (9) along the optical axis, in order to establish an interferometric operating mode,     and directing the light of a second illumination device (1b) though the beam divider (2) only in the direction from the measuring object (9) away to the image recording device (12) in order to prevent a substantial part of the light to enter the reference light path (3) and to operate in an imaging operating mode.

27. The method according to claim 26, further including the step of performing phase shifting interferometry in a third operating mode by activating the first illumination device (1a) including the first light source (24) being short coherent and further including an additional long coherent light source (25) which is also activated.

28. The method according to claim 26, further including the step of scanning the measuring object (9) with a scanner (16) arranged in the field of sight of the apparatus and measuring in a point-like manner.

* * * * *